United States Patent
Ferman et al.

(10) Patent No.: US 9,710,940 B2
(45) Date of Patent: Jul. 18, 2017

(54) METHODS, SYSTEMS AND APPARATUS FOR SUMMARIZING A MEETING

(75) Inventors: Ahmet Mufit Ferman, Vancouver, WA (US); John E. Dolan, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1284 days.

(21) Appl. No.: 13/290,117

(22) Filed: Nov. 6, 2011

(65) Prior Publication Data

US 2013/0113804 A1    May 9, 2013

(51) Int. Cl.
  *G06T 11/20* (2006.01)
  *G06Q 10/10* (2012.01)
  *G06Q 10/06* (2012.01)
  *G06Q 50/10* (2012.01)

(52) U.S. Cl.
  CPC ........ *G06T 11/206* (2013.01); *G06Q 10/0631* (2013.01); *G06Q 10/0633* (2013.01); *G06Q 50/10* (2013.01)

(58) Field of Classification Search
  None
  See application file for complete search history.

(56) References Cited

U.S. PATENT DOCUMENTS

| | | | |
|---|---|---|---|
| 6,593,942 B1 * | 7/2003 | Bushmitch et al. | 715/721 |
| 6,732,114 B1 * | 5/2004 | Aamodt et al. | 715/243 |
| 7,257,774 B2 * | 8/2007 | Denoue et al. | 715/719 |
| 7,395,509 B1 | 7/2008 | Callanan et al. | |
| 7,526,729 B1 * | 4/2009 | Callanan et al. | 715/751 |
| 7,606,444 B1 * | 10/2009 | Erol et al. | 382/305 |
| 7,640,302 B2 | 12/2009 | Mizunashi et al. | |
| 2004/0021686 A1 | 2/2004 | Barberis | |
| 2005/0102667 A1 * | 5/2005 | Barta et al. | 717/174 |
| 2005/0275716 A1 * | 12/2005 | Shingu et al. | 348/14.13 |
| 2006/0088806 A1 * | 4/2006 | Quinn | 434/236 |
| 2006/0294453 A1 * | 12/2006 | Hirata | 715/500.1 |
| 2007/0040901 A1 | 2/2007 | Yamazaki | |
| 2007/0040902 A1 | 2/2007 | Wakai | |
| 2007/0192103 A1 * | 8/2007 | Sato et al. | 704/253 |
| 2007/0217576 A1 * | 9/2007 | Blair | H04M 3/51 379/1.01 |
| 2008/0059903 A1 * | 3/2008 | Kaminaga et al. | 715/797 |
| 2008/0189624 A1 | 8/2008 | Chotai et al. | |
| 2008/0255847 A1 * | 10/2008 | Moriwaki et al. | 704/270.1 |
| 2009/0193327 A1 * | 7/2009 | Roychoudhuri et al. | 715/231 |
| 2009/0276492 A1 | 11/2009 | Bobbitt et al. | |
| 2010/0157742 A1 * | 6/2010 | Relyea et al. | 368/28 |

(Continued)

FOREIGN PATENT DOCUMENTS

| | | |
|---|---|---|
| JP | H06266632 A | 9/1994 |
| JP | 2004072428 A | 3/2004 |

(Continued)

OTHER PUBLICATIONS

Japanese Office Action, Patent Application No. 2012-242119, Mailing Date: Sep. 17, 2013.

*Primary Examiner* — David H Chu
(74) *Attorney, Agent, or Firm* — Alleman Hall Creasman & Tuttle LLP

(57) ABSTRACT

Aspects of the present invention are related to systems, methods and apparatus for providing a compact, yet informative, representation of meeting content.

21 Claims, 8 Drawing Sheets

(56) References Cited

U.S. PATENT DOCUMENTS

2010/0235446 A1    9/2010   Hehmeyer et al.
2012/0179465 A1*   7/2012   Cox et al. .................... 704/235

FOREIGN PATENT DOCUMENTS

| JP | 2005109710 A | 4/2005 |
|---|---|---|
| JP | 2005234722 A | 9/2005 |
| JP | 2006-146311 A | 6/2006 |
| JP | 2010176603 A | 8/2010 |

* cited by examiner

METHODS, SYSTEMS AND APPARATUS FOR SUMMARIZING A MEETING

FIELD OF THE INVENTION

Embodiments of the present invention relate generally to methods, systems and apparatus for preserving meeting content and, in particular, to methods, systems and apparatus for summarizing a meeting.

BACKGROUND

With the emergence and proliferation of online collaboration tools and software, meeting participants, both locally and remotely attending, may generate, edit and manage meeting content. Additionally, meeting content may be generated by multiple content sources and/or streams.

The historical paradigm of preserving meeting content, for subsequent review and consumption, by recording the meeting in its entirety may not be suitable for all sources of meeting content. Furthermore, while such records provide access to all meeting content, the records may be difficult to navigate and may be time-consuming to review.

Methods, systems and apparatus for providing a compact, yet informative, representation of meeting content may be desirable.

SUMMARY

Some embodiments of the present invention comprise methods, systems and apparatus for providing a compact, yet informative, representation of meeting content.

According to a first aspect of the present invention, a meeting may be summarized in a compact, graph-based representation.

According to a second aspect of the present invention, a summary view associated with a content source may comprise a hierarchical view of the content associated with the content source, wherein each level of the hierarchical view is associated with a level of content detail.

According a third aspect of the present invention, a summary view associated with a content source may comprise a "wagon-wheel" view, wherein the summary view may comprise a plurality of thumbnail snapshots, associated with the content source, organized, around a node corresponding to the content source, in a clockwise spatial arrangement corresponding to temporal progression.

According to a fourth aspect of the present invention, a summary view associated with a content source may comprise a static snapshot, associated with the content source, wherein the content in the static snapshot may be clustered according to primary contributor.

According to a fifth aspect of the present invention, a summary view associated with a content source may comprise a static snapshot, associated with the content source, wherein the content in the static snapshot may be clustered according to semantic relationship.

According to a sixth aspect of the present invention, a summary view associated with a content source may comprise a static snapshot, associated with the content source, wherein the content in the static snapshot may be clustered according to syntactic relationship.

According to a seventh aspect of the present invention, a summary view associated with a content source may comprise a static snapshot, associated with the content source, wherein the static snapshot may be overlaid with a temporal-progression sequence indicator.

According to an eighth aspect of the present invention, a summary view associated with a content source may comprise a plurality of snapshots, associated with the content source, wherein each snapshot in the plurality of snapshots is associated with one of a plurality of saliency events associated with the first content source.

According to a ninth aspect of the present invention, a meeting may be summarized according to active content sources in relation to a meeting timeline.

According to a tenth aspect of the present invention, a node, in a meeting summary, corresponding to a content source may be expanded to provide a detailed summary of the content source.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods, systems and apparatus of the present invention is not intended to limit the scope of the invention, but it is merely representative of the presently preferred embodiments of the invention.

Elements of embodiments of the present invention may be embodied in hardware, firmware and/or a non-transitory computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that a non-transitory computer program product comprising a computer-readable storage medium having instructions stored thereon/in which may be used to program a computing system, hardware and/or firmware may be created by one of ordinary skill in the art to carry out the various logical functions described herein.

With the emergence and proliferation of online collaboration tools and software, meeting participants, both locally and remotely attending, may generate, edit and manage meeting content. Additionally, meeting content may be generated by multiple content sources and/or streams.

The historical paradigm of preserving meeting content, for subsequent review and consumption, by recording the meeting in its entirety may not be suitable for all sources of meeting content. Furthermore, while such records provide access to all meeting content, the records may be difficult to navigate and may be time-consuming to review.

Figure 1:
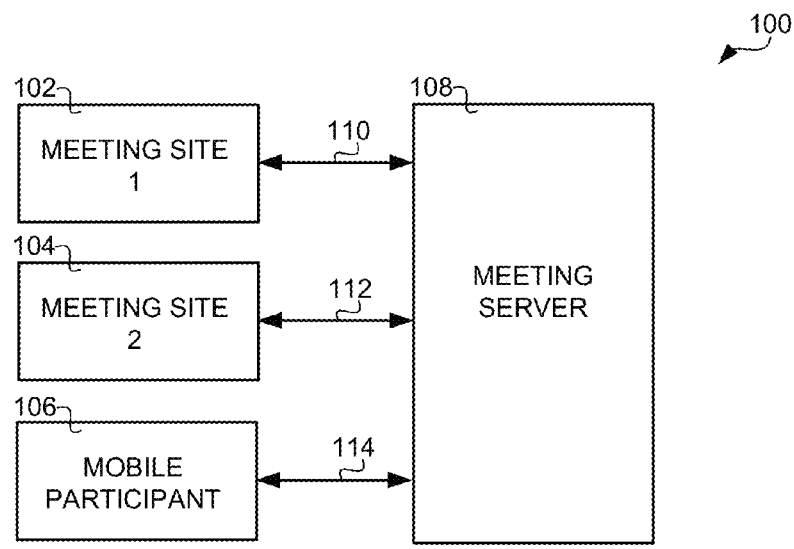
FIG. 1 is a chart showing exemplary embodiments of the present invention comprising a meeting server communicatively coupled with a plurality of meeting sites and a remotely participating mobile attendee.

Methods, systems and apparatus for providing a compact, yet informative, representation of meeting content may be desirable Some embodiments of the present invention may be understood in relation to FIG. 1. FIG. 1 illustrates an exemplary meeting system 100. Attendees, also referred to as participants, meeting attendees and meeting participants, at one, or more, (three shown) locations 102, 104, 106 may participate in a collaborative session, also referred to as a meeting. A meeting server 108 may facilitate communication between the locations 102, 104, 106 and may comprise a repository for meeting-related content. A meeting site (two shown) 102, 104 may be a location whereat one, or more, attendees may collectively gather. A meeting site may comprise an apparatus, for example, a personal computer, a meeting appliance comprising an embedded processor or another processing apparatus, on which a client application, associated with a meeting-application program running on the meeting server 108, may run. A meeting site 102, 104 further may be equipped with one, or more, collaboration-facilitating devices, for example, a display, a television, a whiteboard, a physical writing surface, a projector, an audio system and other communication devices. An information-capture device, for example, a camera, a microphone, a recording system and other information-capture devices capable of capturing one, or more, modalities of content generated in a meeting, may allow content generated locally at a particular meeting site 102, 104 to be shared to other meeting sites remote to the particular meeting site at which the content was generated. Additionally, mobile attendees (one shown) 106 may participate in a meeting via a web client. A meeting site 102, 104 may be communicatively coupled 110, 112 with the meeting server 108. A mobile participant 106 may be communicatively coupled 114 with the meeting server 108. Exemplary communication links include a serial communication link via a serial port, a USB link, an Ethernet link, an Internet link, a cellular service link and other wired and wireless communication links.

A meeting-application program may enable meeting participants to join a meeting. Participants may share, create, modify and manage meeting content. Exemplary meeting content may include a document, an image, an audio stream, a video stream and other meeting content. Participants at different locations may view a writing surface, for example, a whiteboard, a chalk board, a poster-sized tablet and other writing surfaces, and may dynamically edit an electronic copy of the viewed writing surface. The writing surface may be at the same location as the editing participant or the writing surface may be at a location remote to the editing participant. The meeting-application program may generate indices, or other markers, on a meeting timeline. Exemplary markers may include screenshots and other captured content. A participant may browse a meeting history and randomly access previously occurring instances in the meeting. A marker may be selected automatically based on an assessment of the significance of shared meeting content. A marker may be selected manually by a meeting participant. An exemplary method for automatic selection of a marker based on visual significance criteria is disclosed in U.S. patent application Ser. No. 12/697,076, entitled "Methods and Systems for Collaborative-Writing-Surface Image Sharing," filed on Jan. 29, 2010, invented by Richard John Campbell, Michael James Heilmann and John E. Dolan, said U.S. patent application Ser. No. 12/697,076 is hereby incorporated herein by reference in its entirety.

In some embodiments of the present invention, a meeting may be summarized in a compact, graph-based representation.

Figure 2:
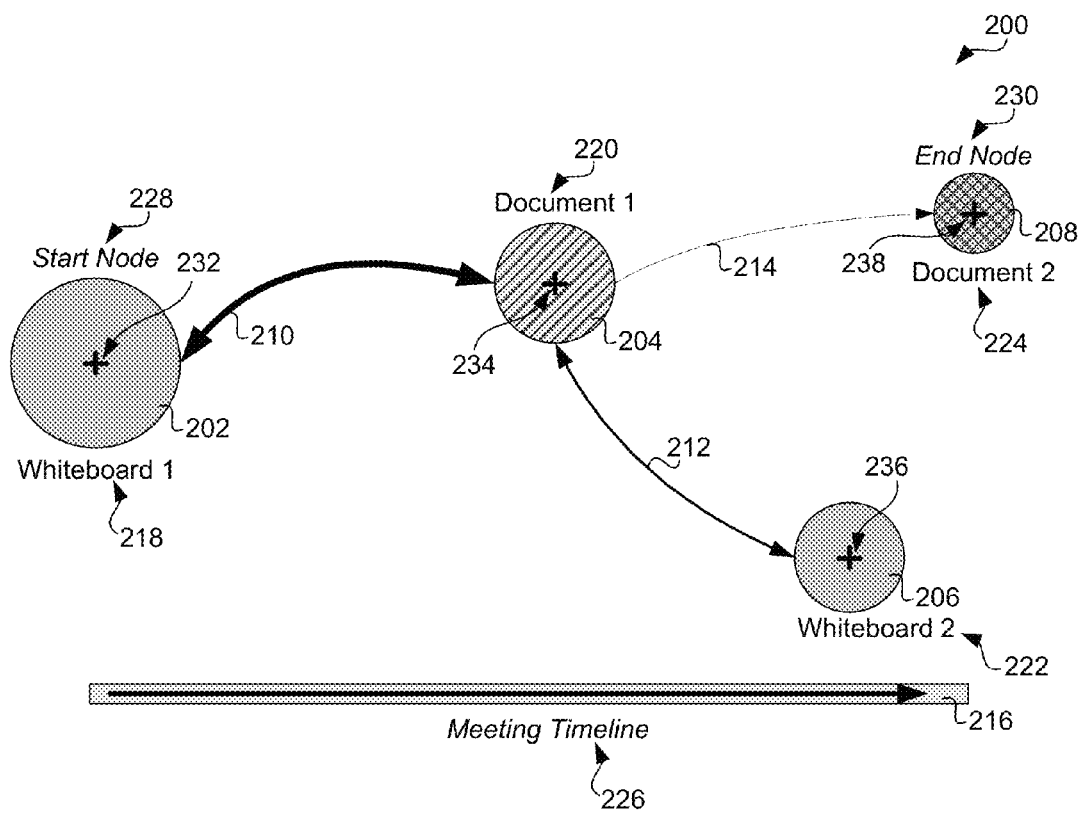
FIG. 2 is a picture depicting an example of a meeting summary according to exemplary embodiments of the present invention.

FIG. 2 illustrates an exemplary meeting summary 200 according to exemplary embodiments of the present invention. A shared meeting-content source, also referred to as a content source and a meeting-content source, may be represented by a node (four shown) 202, 204, 206, 208 in the meeting summary 200. A node in the example shown in FIG. 2 is depicted as a circle. This is for illustration purposes and should not be construed as a limitation.

According to exemplary embodiments of the present invention, the size of a node 202, 204, 206, 208 may be related to the amount of time expended, during the meeting, on the shared meeting-content source associated with the node. In some embodiments of the present invention, the size of a node 202, 204, 206, 208 may be proportional to the amount of time expended, during the meeting, on the shared meeting-content source associated with the node. In the exemplary meeting summary 200 illustrated in FIG. 2, node 202 may indicate, by its relatively larger size in comparison to node 204, that a greater amount of time was expended, during the meeting, on the shared meeting-content source associated with node 202 than on the shared meeting-content source associated with node 204.

According to some exemplary embodiments of the present invention, an arc (three shown) 210, 212, 214 between two nodes may indicate a transition between the meeting-content sources associated with the two nodes. For example, a directed arc from a first node to a second node may indicate a transition between the meeting-content source associated with the first node to the meeting-content source associated with the second node. A transition may refer, for example, to the addition, to the meeting, of the meeting-content source associated with the second node, the addition of content to the meeting-content source associated with the second node, the focus of a recording device onto the meeting-content source associated with the second node and other actions which may transition attention in the meeting to the meeting-content source associated with the second node from the meeting-content source associated with the first node. In some exemplary embodiments of the present invention, the thickness of an arc 210, 212, 214 may be related the number of transitions. In some exemplary embodiments of the present invention, the thickness of an arc 210, 212, 214 may be proportional to the number of transitions. In the meeting summary 200 illustrated in FIG. 2, the relatively thicker arc 210, in comparison to the relatively thinner arc 212, may indicate that the number of transitions between the meeting-content source associated with node 202 and the meeting-content source associated with node 204 is greater than the number of transitions between the meeting-content source associated with node 206 and the meeting-content source associated with node 204.

According to some exemplary embodiments of the present invention, the position of a node may be indicative of the temporal order in which the meeting-content source associated with the node was first introduced and/or accessed during the meeting. The meeting summary may comprise a temporal-progression indicator that may indicate which direction in the meeting summary may be associated with a temporal ordering. For example, in the exemplary meeting summary 200 shown in FIG. 2, a "Meeting Timeline" 216 indicates that initial meeting-content source introduction/access associated with nodes, for example, 202, 204, on the left-side of the meeting summary 200 occur temporally prior to initial meeting-content source introduction/access associated with nodes, for example, 206, 208, farther to the right in the meeting summary 200.

According to some exemplary embodiments of the present invention, each node in a meeting summary may have an associated textual label indicating the type of content source associated with the node. For the exemplary meeting summary 200 illustrated in FIG. 2, the textual label "Whiteboard 1" 218 placed in proximity to node 202 may indicate that the content source associated with the node 202 is a whiteboard, the textual label "Document 1" 220 placed in proximity to node 204 may indicate that the content source associated with the node 204 is a document, the textual label "Whiteboard 2" 222 placed in proximity to node 206 may indicate that the content source associated with the node 206 is a whiteboard and the textual label "Document 2" 224 placed in proximity to node 208 may indicate that the content source associated with the node 208 is a document. Additional textual labels may indicate a first and a last content source introduced/accessed during the meeting. For example, for the exemplary meeting summary 200 illustrated in FIG. 2, the textual label "Start Node" 228 placed in proximity to node 202 may indicate that the content source associated with the node 202 is the initial content source introduced/accessed during the meeting and the textual label "End Node" 230 placed in proximity to node 208 may indicate that the content source associated with the node 208 is the final content source introduced/accessed during the meeting. A textual label may be used to label the temporal-progression indicator. For example, in FIG. 2, the textual label "Meeting Timeline" 226 placed in proximity to the temporal-progression indicator may identify the direction associated with the temporal progression of the meeting.

In some exemplary embodiments of the present invention, a visual property of a node, for example, a node color, a fill pattern, an outline color and other visual properties, may indicate a content-source property. For example, a first type of content source may be associated with a first visual property. In the exemplary meeting summary 200 shown in FIG. 2, a node 202, 206 for which the content source is a whiteboard may be filled with a gray color. For further example, a first type of application by which a content source may be generated may be associated with a first visual property. In the exemplary meeting summary 200 shown in FIG. 2, a node 204 associated with a document content source generated by Microsoft Word may be filled with a diagonal-hatch pattern, and a node 208 associated with a document content source generated by Microsoft Excel may be filled with a cross-hatch pattern.

In some exemplary embodiments of the present invention, a meeting-summary node may comprise an expansion indicator that may indicate that an expanded view of the content related to the corresponding content source may be available. For example, for the nodes 202, 204, 206, 208 in FIG. 2, the "+" symbol 232, 234, 236, 238 centered in the node may denote that an expanded view of content related to the corresponding content source may be available. An expanded view may be displayed in response to an expansion-indicator activation action. Exemplary expansion-indicator activation actions may include a mouse click in a region proximate to the expansion indicator, a key-stroke combination in conjunction with cursor placement in a region proximate to the expansion indicator, a touch-screen activation in a region proximate to the expansion indicator and other actions commonly used to obtain an expanded view in relation to a summary view.

According to some exemplary embodiments of the present invention, an expanded view associated with a content source may comprise metadata associated with the content source, textual material associated with the content source, visual material associated with the content source, a link to an application that may initiate playback of audio material associated with the content source and other more comprehensive information associated with the content source.

The format and type of an expanded view be based on a property of the content source corresponding to the expanded view. In some embodiments of the present invention, a writing surface, for example, a whiteboard or other writing surface, may be compactly represented by a series of snapshots. A snapshot, in the series of snapshots, may be acquired at a periodic interval, may be captured automatically according to predetermined criteria, for example, when a significant amount of change is detected in the surface content of the writing surface, or may be explicitly triggered by an attendee. In some embodiments of the present invention, a meeting coordinator may configure the method and parameters of snapshot acquisition.

In some embodiments of the present invention, an expanded view may comprise a plurality of thumbnail snapshots organized around the node in a clockwise spatial arrangement corresponding to temporal progression. This particular presentation mode may be referred to as a "wagon wheel" view, due to the visual suggestion of a wheel, wherein the node is the center of the "wheel" and each snapshot is rendered at the end of a "spoke" emanating from the center of the "wheel."

In alternative embodiments of the present invention, an expanded view may be presented in hierarchical form, with each progressive level depicting more detailed views of the expansion.

In some embodiments of the present invention, the expansion indicator may be replaced on the expanded view with an indicator that an expanded-view mode may be presently engaged.

Figure 3:
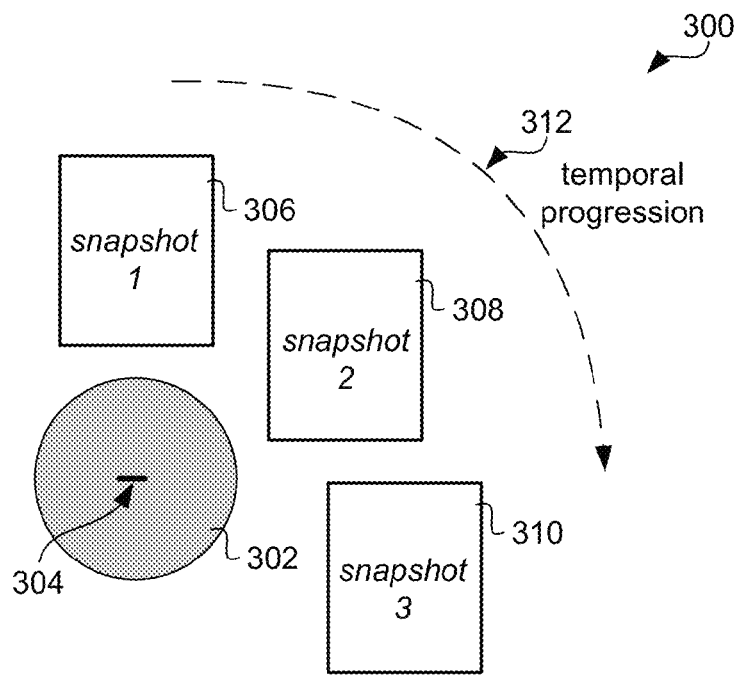
FIG. 3 is a picture depicting an example of a "wagon-wheel" expanded view of a content-source node, in a meeting summary, according to exemplary embodiments of the present invention.

FIG. 3 illustrates a "wagon wheel" expanded view 300 corresponding to content source node 302. The "−" symbol 304 replaces the "+" symbol in the middle of the node 302, indicating that the expanded-view mode is engaged. Three snapshots 306, 308, 310 may be displayed around the node 302, and the temporal progression of the three snapshots 306, 308, 310 is in a clockwise direction 312 starting from the top of the node 302.

Figure 4:
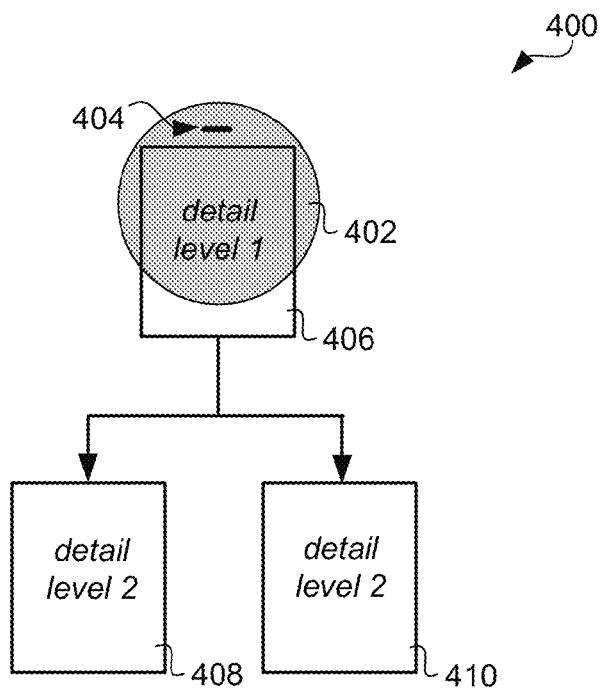
FIG. 4 is a picture depicting an example of a hierarchical-form for an expanded view of a content-source node, in a meeting summary, according to exemplary embodiments of the present invention.

FIG. 4 illustrates a hierarchical-form expanded view 400 corresponding to content source node 402. The "−" symbol 404 replaces the "+" symbol, and the "−" symbol 404 is placed at the top of the node to allow for a first-level detailed view 406 of the summary to be placed on the node 402. Additional, more-detailed views 408, 410 may be displayed in a hierarchical form from the base view 406.

A meeting summary according to embodiments of the present invention may afford a representation of a meeting that provides immediate visual feedback to a user about the progression of the associated meeting and may convey significant information about at which content sources the bulk of time during the meeting was spent. For example shown in FIG. 2, the meeting-event summary may indicate that "Whiteboard 1," "Whiteboard 2" and "Document 1" were extensively used in the collaborative event and that "Document 2" likely may be the end product of the meeting.

Figure 5A:
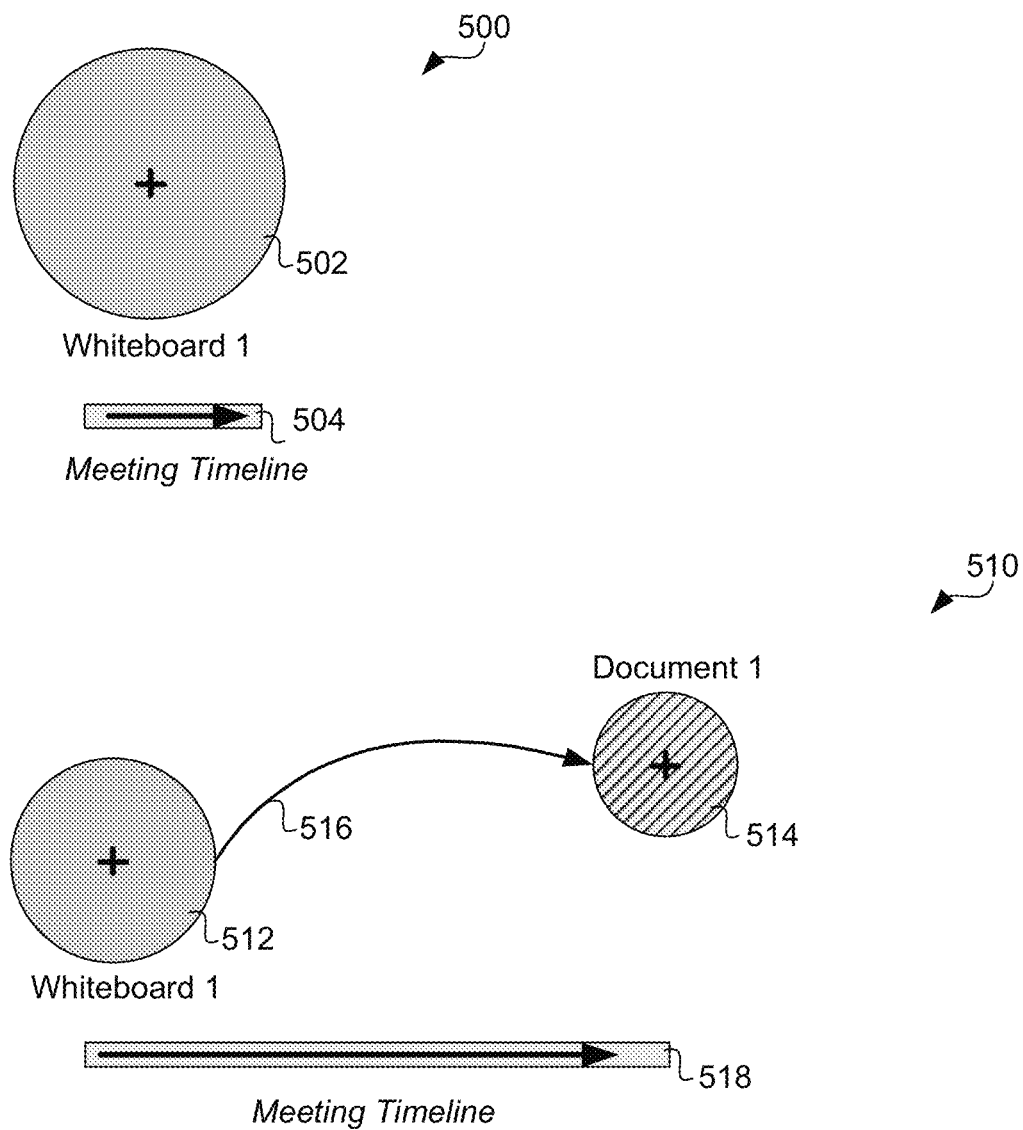
FIGS. 5A and 5B are a picture depicting four examples of meeting summaries, corresponding to four time instances, according to exemplary embodiments of the present invention.
Figure 5B:
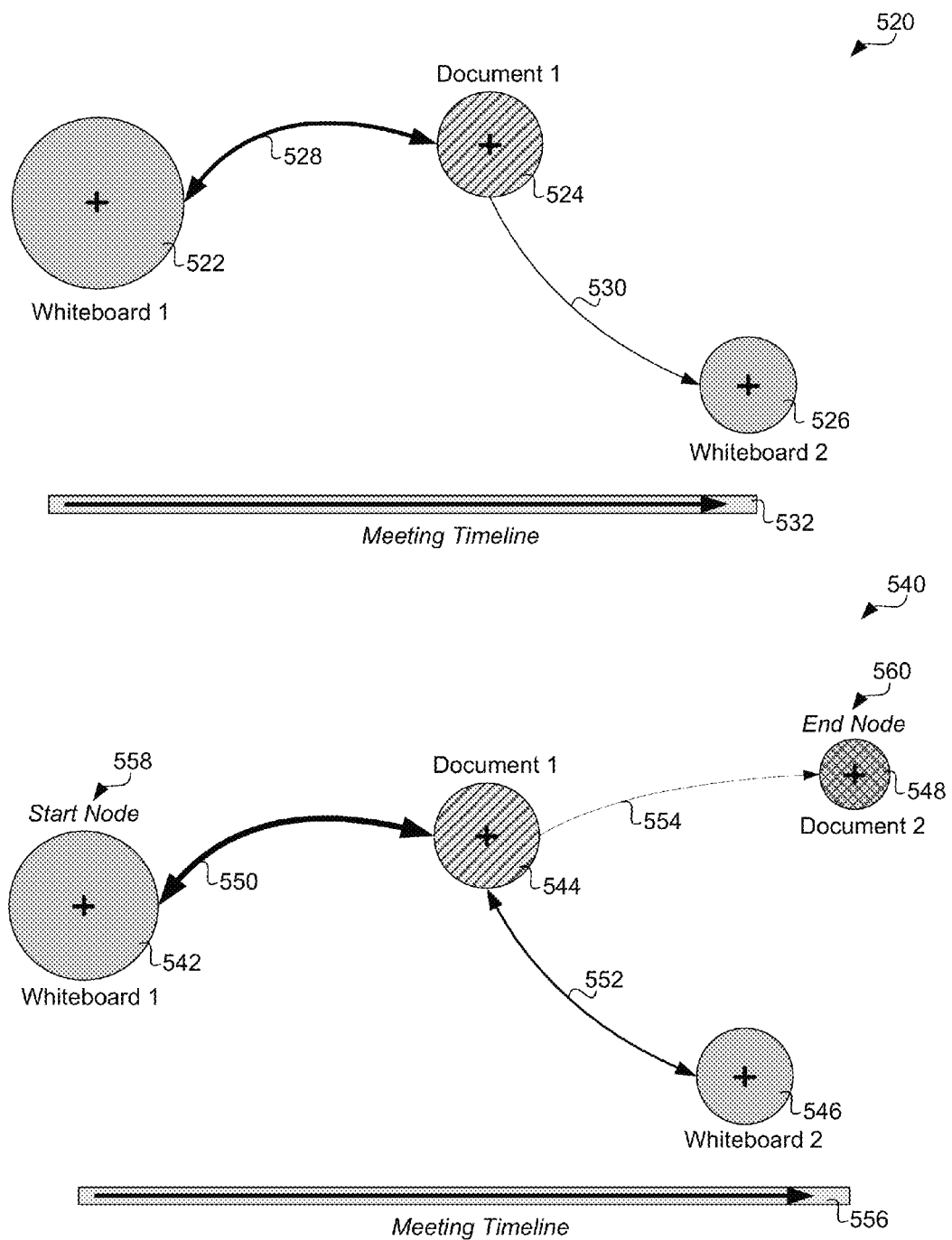

In some embodiments of the present invention, a meeting summary for a meeting may be dynamically generated, by a meeting-application program, as the meeting progresses. In some of these embodiments, a meeting summary may be accessed by a participant at any time during the meeting. FIG. 5 illustrates four instances associated with the exemplary meeting summary shown in FIG. 2 as it is being dynamically created and updated. A first meeting summary 500 generated at the start of the meeting contains one node 502 associated with a whiteboard labeled "Whiteboard 1." A temporal-progression indicator 504 shows that the meeting has just started.

Further along in the meeting, as seen in a subsequent meeting summary 510, a second content source, "Document 1," is introduced. The subsequent meeting summary 510 has two nodes 512, 514: a first node 512 corresponding to the first content source, "Whiteboard 1," and a new node 514 corresponding to the newly introduced content source, "Document 1."

An arc 516 directed from the first node 512 to the new node 514 indicates that a transition between use of the first content source and the newly introduced content source has occurred.

A temporal-progression indicator 518 indicates the meeting timeline.

The size of the node corresponding to the first content source decreases, between the first meeting summary 500 and the subsequent meeting summary 510, as more of the total meeting time gets devoted to other meeting materials, namely the newly introduced content source, "Document 1."

Towards the end of the meeting, a second whiteboard, labeled "Whiteboard 2," becomes active and is added to a visual summary 520 generated at a time instance subsequent to, or corresponding to, the activation of the second whiteboard. The visual summary 520 comprises three nodes: a first node 522 corresponding to the first content source, "Whiteboard 1," a second node 524 corresponding to the second content source, "Document 1" and a third node 526 corresponding to a third content source, the newly introduced whiteboard, "Whiteboard 2."

Frequent transitions between "Whiteboard 1" and "Document 1" are represented by the now bi-directional, considerably thicker arc 528, in comparison to the arc 516 in the previous meeting summary 510, between the first node 522 and the second node 524.

An arc 530 directed from the second node 524 to the third node 526 indicates that a transition between use of the second content source, "Document 1," and the third content source, "Whiteboard 2," has occurred.

A temporal-progression indicator 532 may indicate the meeting timeline.

The node sizes and arc thicknesses may be finalized once the meeting is adjourned. An exemplary finalized meeting summary 540 may be illustrated in FIG. 5. Subsequent to the time the previously generated meeting summary 520 was generated, a fourth content source 548 was introduced. The finalized meeting summary 540 comprises four nodes: a first node 542 corresponding to the first content source, "Whiteboard 1," a second node 544 corresponding to the second content source, "Document 1," a third node 546 corresponding to the third content source, "Whiteboard 2," and a fourth node corresponding to the newly introduced content source 548, "Document 2."

Frequent transitions between "Whiteboard 1" and "Document 1" are represented by the bi-directional, considerably thicker arc 550, in comparison to the arc 528 in the previous meeting summary 520, between the first node 542 and the second node 544.

The now bi-directional, thicker arc 552, in comparison to the corresponding arc 530 in the previous meeting summary 520, between the second node 544 and the third node 546, indicates that a transition has occurred from the third content source, "Whiteboard 2" to the second content source "Document 1."

A uni-directional arc 554 directed from the second node 544 to the fourth node 548 indicates that a transition between use of the second content source, "Document 1," and the fourth content source, "Document 2," has occurred.

A temporal-progression indicator 556 indicates the meeting timeline.

Textual labels 558, 560 have been added indicating the initial and terminating nodes, respectively, associated with the first content source and final content source of the meeting.

As implied by the '+' sign on each node, it is possible to expand each node and view individual node summaries while the summary is being generated. In some embodiments, a summary may also be saved in a format that supports playback, such as Adobe Flash, to enable the user to view it as a video clip.

In alternative embodiments of the present invention, an arc between a first node and a second node may denote a relationship other than transition order. In some embodiments, a link formed between two nodes may represent a semantic correlation between a first content source associated with the first node and a second content source associated with the second node. For example, a lengthy discussion using a whiteboard may generate input into a specification document that may be an end product of a meeting. In this case, the semantic relationship between the two content sources, the whiteboard and the specification document, may be denoted by an arc, wherein the arc thickness may be determined by the strength of the semantic coupling. In some embodiments, the arc may be directed to clearly convey the dynamic of the relationship. For the example of the whiteboard and specification document, the arc may be directed from the node corresponding to the whiteboard content source to the node corresponding to the specification document, since the whiteboard content provides the genesis of the specification document.

In some embodiments of the present invention, a semantic correlation may be explicitly specified by a participant during a meeting. In some of these embodiments, a meeting-application program may provide an option to specify a semantic correlation. In alternative embodiments of the present invention, a semantic correlation may be automatically determined, by a meeting-application program, through extraction and analysis of textual keywords from each source.

Figure 6:
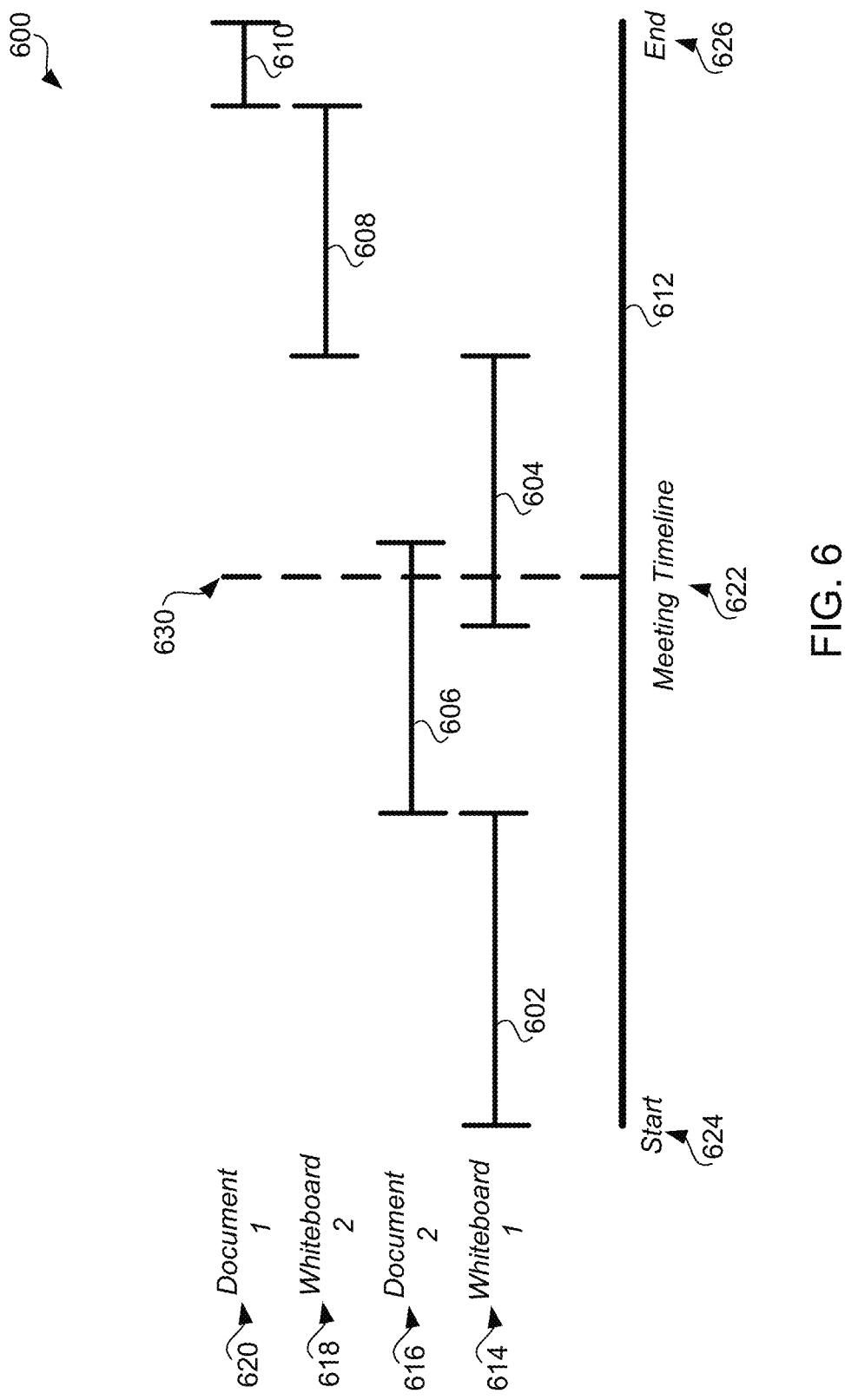
FIG. 6 is a picture depicting an example of a meeting summary according to exemplary embodiments of the present invention.

In some embodiments of the present invention described in relation to FIG. 6, an alternative meeting summary format may be generated to provide a meeting-summary image 600 that may visually depict an instance whereat two content sources may be active simultaneously. Each content source may have an associated display bar(s) 602, 604, 606, 608, 610 indicating a time period(s), relative to a temporal-progression indicator 612, during which the associated content source may be active in the meeting. The aggregate length of the bar(s) 602, 604, 606, 608, 610, for a given content source, may denote the total amount of time dedicated to that source in the meeting and may provide a measure of a source's relative significance, similar to a node size in the directed graph view. For example, the combined lengths of display bar 602 and display bar 604 reflect the total amount of time dedicated, in the meeting, to the content source 614 "Whiteboard 1." The display bars 602, 604, 606, 608, 610 may be aligned relative to the temporal-progression indicator 612 and relative to a textual identifier 614, 616, 618, 620 associated with the content source. The temporal-progression indicator 612 may have a textual identifier 622 labeling the temporal-progression indicator 612 and a plurality of textual identifiers 624, 626 labeling temporal events, for example, the start and the end of the meeting. Time instances at which more than one content source may be active may be readily determined by visualizing a line 630 through the display bars at a particular time instance.

In some embodiments of the present invention, understood in relation to FIGS. 7-10, a meeting-content source summary may be displayed in conjunction with enhanced source-navigation information. In some of these embodiments, a static summary representation of a content source may be rendered dynamically with spatiotemporal coupling. In alternative embodiments, a static summary representation of a content source may be rendered dynamically with spatiotemporal clustering. Exemplary enhanced source-navigation information may comprise semantic-relationship clustering, temporal-progression sequence display, contributor-based clustering and other source navigation information that may enhance a user experience.

Figure 7:
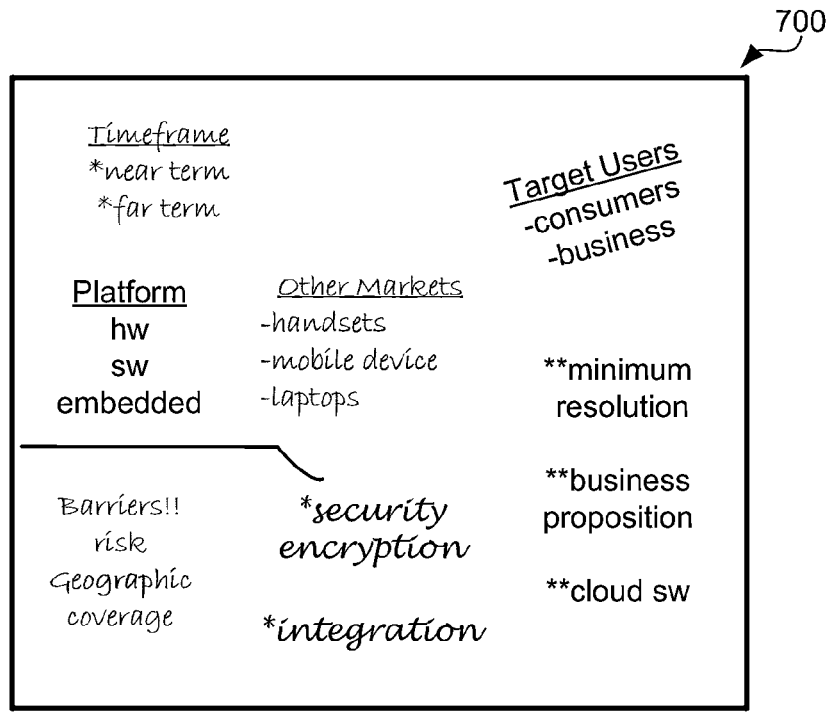
FIG. 7 is a picture depicting an example of a static summary of a content source.

FIG. 7 illustrates a static summary 700 of a content source.

Figure 8:
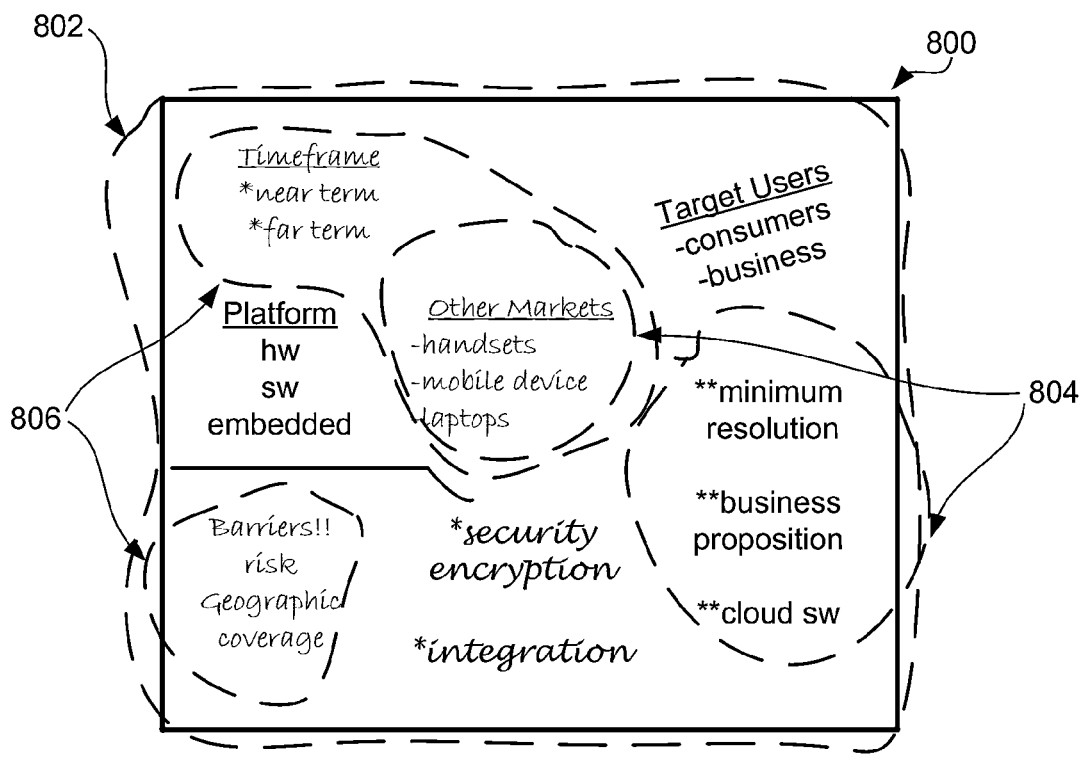
FIG. 8 is a picture depicting an example of a static summary clustered by primary contributor according to exemplary embodiments of the present invention.

According to exemplary embodiments of the present invention, the content depicted in the static summary 700 may be clustered by primary contributor as illustrated in the static summary 800 shown in FIG. 8. Demarked region(s) may be associated with a meeting participant, wherein the associated meeting participant is the contributor responsible for the generated content. In the exemplary static summary 800 shown in FIG. 8, five regions are associated with three participants. A first region 802 may associated with a first participant/contributor. A second and third region 804 may be associated with a second participant/contributor, and a fourth and fifth region 806 may be associated with a third participant/contributor. In some embodiments, the region-demarcation indicators, for example, the dashed-lines shown in FIG. 8, may be color coded based on contributor. In some embodiments of the present invention, contributor-based clustering may be generated explicitly by a meeting participant. In alternative embodiments of the present invention, contributor-based clustering may be generated automatically by the meeting-application program using an unsupervised clustering technique.

Figure 9:
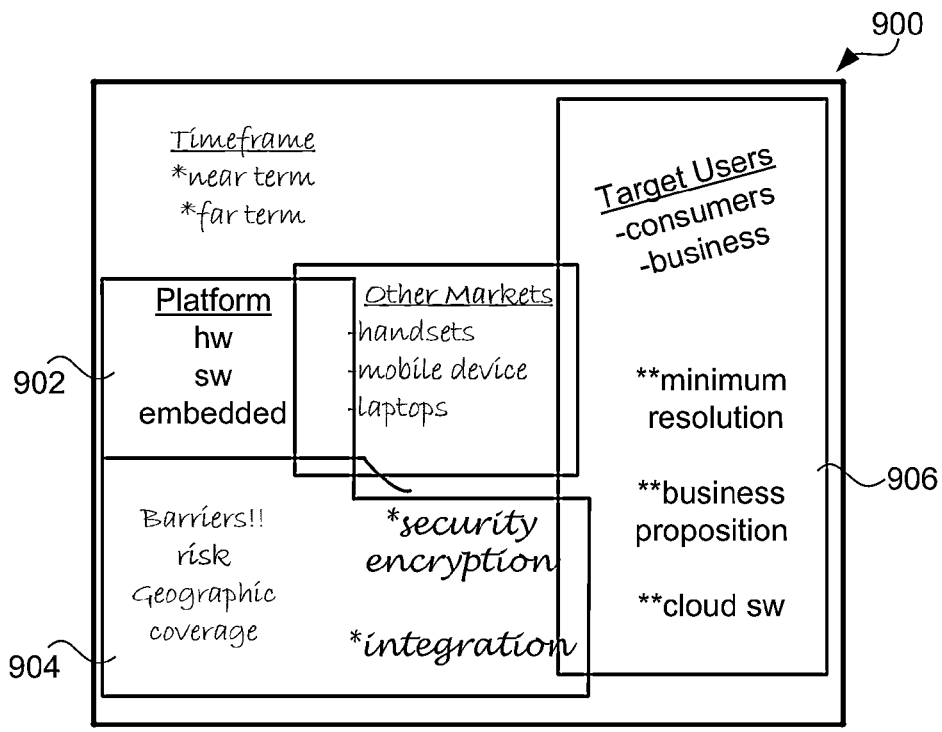
FIG. 9 is a picture depicting an example of a static summary clustered according to semantic relationship according to exemplary embodiments of the present invention.

According to exemplary embodiments of the present invention, the content depicted in the static summary 700 may be clustered according to semantic relationship as illustrated in the static summary 900 shown in FIG. 9. Demarked regions may be formed according to a semantic relationship of the content. A first entry on the content source may be grouped with a second entry when the two entries are related semantically. In the exemplary static summary 900 shown in FIG. 9, three semantically similar regions 902, 904, 906 are illustrated. In some embodiments, the regions may be demarcated using boundary demarcation, as illustrated in FIG. 9. In alternative embodiments, a first region may be displayed with a first transparency and fill color, while a second region may be displayed with a second transparency and fill color. In some embodiments of the present invention, semantic-relationship-based clustering may be generated explicitly by a meeting participant. In alternative embodiments of the present invention, semantic-relationship-based clustering may be generated automatically by the meeting-application program using an unsupervised clustering technique in conjunction with semantic detection.

In alternative embodiments, demarked regions may be formed according to a syntactic relationship of the content. A first entry on the content source may be grouped with a second entry when the two entries are related syntactically. Exemplary syntactic relationships may include color similarity, spatial proximity and other feature-based cluster criteria. In some embodiments of the present invention, syntactic-relationship-based clustering may be generated explicitly by a meeting participant. In alternative embodiments of the present invention, syntactic-relationship-based clustering may be generated automatically by the meeting-application program using an unsupervised clustering technique in conjunction with syntax detection.

Figure 10:
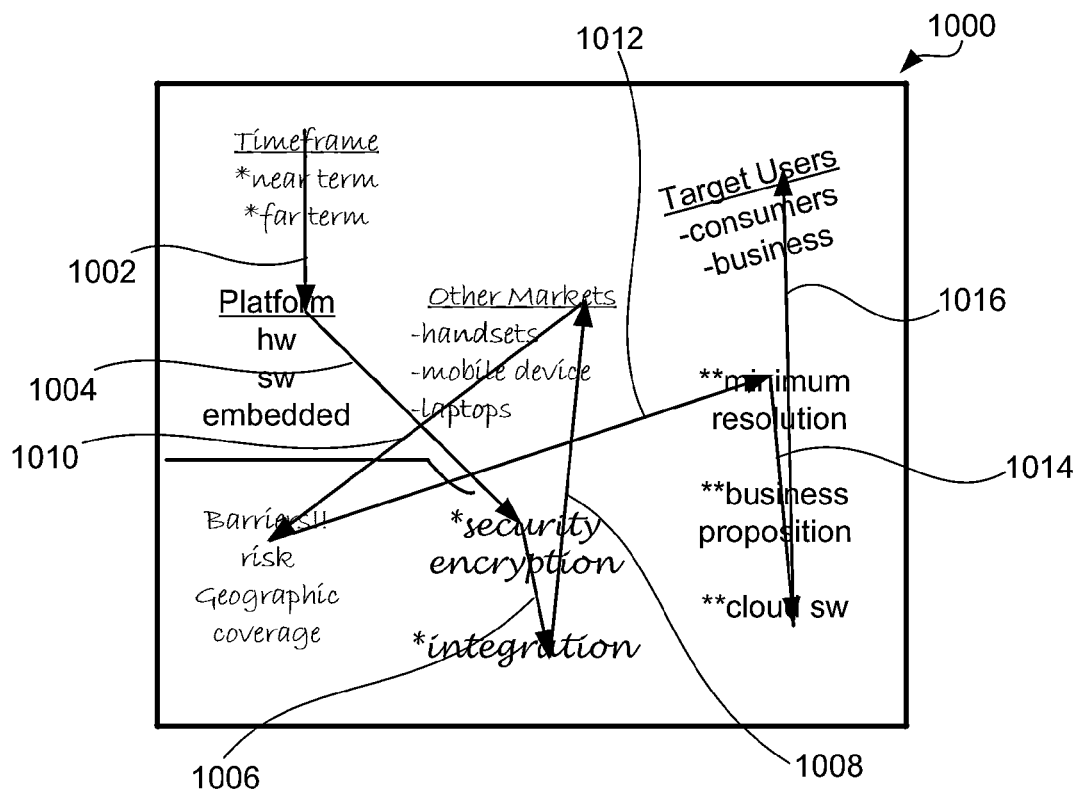
FIG. 10 is a picture depicting an example of a static summary displayed in conjunction with a temporal-progression sequence indicator according to exemplary embodiments of the present invention.

According to exemplary embodiments of the present invention, the content depicted in the static summary 700 may be displayed in conjunction with a temporal-progression sequence indicator as illustrated in FIG. 10. FIG. 10 illustrates a static summary 1000 overlaid with directed arrows 1002, 1004, 1006, 1008, 1010, 1012, 1014, 1016 indicating the temporal progression of the content shown in the summary.

Some embodiments of the present invention may comprise a combination of enhanced source-navigation information. For example, the directed arrows shown in FIG. 10 may be color coded based on contributor.

Figure 11:
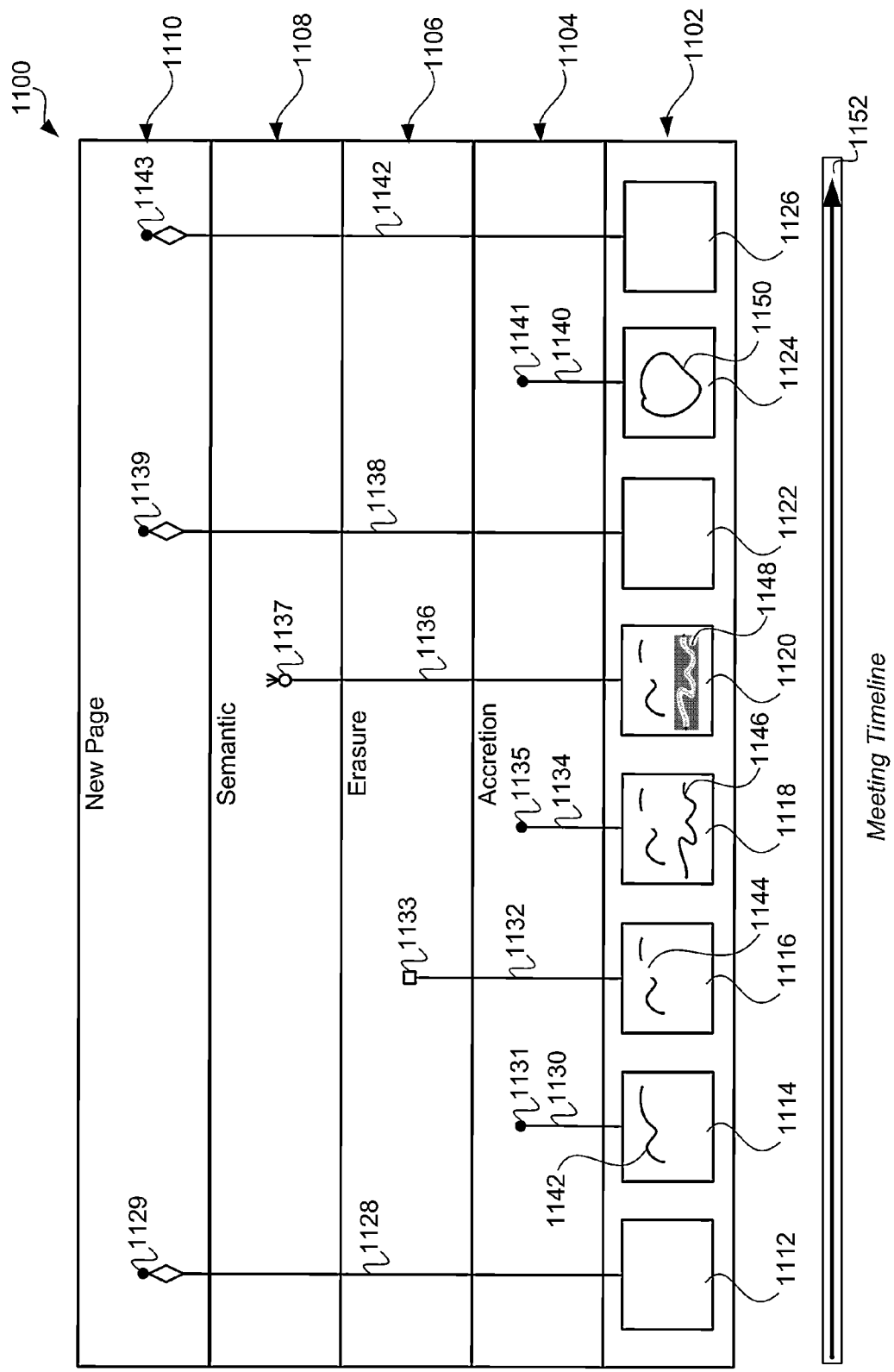
FIG. 11 is a picture depicting an example of a salience-based meeting-content source summary according to exemplary embodiments of the present invention.

In some embodiments of the present invention, understood in relation to FIG. 11, a salience-based meeting-content source summary 1100 may comprise a plurality of snapshots 1112, 1114, 1116, 1118, 1120, 1122, 1124, 1126 of a content source. The snapshots 1112, 1114, 1116, 1118, 1120, 1122, 1124, 1126 may be aligned in a first region 1102 of the salience-based meeting-content source summary 1110. Additional regions 1104, 1106, 1108, 1110 may be associated with a pre-defined event in relation to the content source. Exemplary events may include generation of a new page in the content source, addition of a semantic marking to the content, for example, a highlight or other semantic mark, the removal of a mark from the content, the addition of a mark to the content, a scene cut in a video sequence, a new speaker in an audio recording and other events defined in relation to the content source.

In the exemplary salience-based meeting-content summary 1100 shown in FIG. 11, the events are related to a writing surface. A first event region 1104 is associated with accretion of content, a second event region 1106 is associated with the removal of content, a third event region 1108 is associated with the addition of a semantic marking and a fourth event region 1110 is associated with a new page in the content source. Each snapshot 1112, 1114, 1116, 1118, 1120, 1122, 1124, 1126 may be pinned to an event region. For example, the first snapshot 1112, corresponding to a new page of the content source, may be associated with a new-page event by a line segment 1128 between the snapshot 1112 and the event region 1110 corresponding to a new-page event. The second snapshot 1114, corresponding to accretion of source content 1142, may be associated with an accretion event by a line segment 1130 between the snapshot 1114 and the event region 1104 corresponding to an accretion event. The third snapshot 1116, corresponding to removal of source content 1144, may be associated with an erasure event by a line segment 1132 between the snapshot 1114 and the event region 1106 corresponding to an erasure event. The fourth snapshot 1118, corresponding to accretion of source content 1146, may be associated with an accretion event by a line segment 1134 between the snapshot 1118 and the event region 1104 corresponding to an accretion event. The fifth snapshot 1120, corresponding to addition of a semantic marking 1148 on the source content, may be associated with a semantic-marking event by a line segment 1136 between the snapshot 1120 and the event region 1108 corresponding to a semantic-marking event. The sixth snapshot 1122, corresponding to generation of a new page in the source content, may be associated with a new-page event by a line segment 1138 between the snapshot 1122 and the event region 1110 corresponding to a new-page event. The seventh snapshot 1124, corresponding to accretion of source content 1150, may be associated with an accretion event by a line segment 1140 between the snapshot 1124 and the event region 1104 corresponding to an accretion event. The eighth snapshot 1126, corresponding to creation of a new page, may be associated with a new-page event by a line segment 1142 between the snapshot 1126 and the event region 1110 corresponding to a new-page event.

In some embodiments of the present invention, an event-unique marker may terminate a line segment in an event region. For the example shown in FIG. 11, a diamond-dot line terminator 1129, 1139, 1143 may terminate a line segment pinned in the new-page-event region 1110. A solid-dot line terminator 1131, 1135, 1141 may terminate a line segment pinned in the accretion-event region 1104. An open-square terminator 1133 may terminate a line segment pinned in the erasure-event region 1106. An arrow-open-dot line terminator 1137 may terminate a line segment pinned in the semantic-marking-event region 1108.

A temporal-progression indicator 1152 may be shown in a salience-based meeting-content source summary, for example, the salience-based meeting-content summary 1100 shown in FIG. 11.

In some embodiments of the present invention, an expanded view of a node, in a meeting summary, may comprise a salience-based meeting-content source summary.

In alternative embodiments of the present invention, an expanded view of a node, in a meeting summary, may comprise a static summary clustered by primary contributor.

In alternative embodiments of the present invention, an expanded view of a node, in a meeting summary, may comprise a static summary clustered according to semantic relationship.

In alternative embodiments of the present invention, an expanded view of a node, in a meeting summary, may comprise a static summary displayed in conjunction with a temporal-progression sequence indicator.

It is understood and well known in the art that a user interface may be rendered on a display device of a computing system, wherein a computing system may include at least one input device, for example, a keyboard, a mouse, a touch-screen, a joystick and other input devices, and a central processing unit. The user interface may be rendered through machine- or computer-readable code stored on a memory of the computing system.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A non-transitory, computer-readable medium encoded with a computer program code for implementing a method for rendering a meeting summary, said method comprising:
   storing meeting-related content communicated between a plurality of computing devices during a meeting, the meeting-related content including content from a first content source, and being organized along a meeting timeline;
   defining a first-time-instance first node associated with the first content source of the meeting;

associating a first time instance in the meeting with the first-time-instance first node, the first time instance being a point in time on the meeting timeline corresponding to a point in time at which the first content source was communicated between the plurality of devices in the meeting;

determining a first amount of time expended during the meeting on the first content source;

determining a first size of the first-time-instance first node, the first size being proportional to the first time amount;

rendering the first-time-instance first node associated with the first content source at a position along a graphical representation of the meeting timeline which corresponds to the first time instance and having the first size proportional to the first time amount; and displaying the rendered first-time-instance first node on a display device.

2. A computer-readable medium as described in claim 1, wherein, in said method, said first-time-instance first node comprises a first expansion indicator indicating that an expanded view of a first content related to said first content source is available.

3. A computer-readable medium as described in claim 2, said method further comprising:

receiving a first expansion-indicator activation action associated with said first expansion indicator; and rendering a first expanded view of said first-time-instance first node.

4. A computer-readable medium as described in claim 3, wherein, in said method:

said first expanded view comprises a first plurality of first-content-source snapshots; and said first plurality of first-content-source snapshots are arranged in a hierarchical form according to level of detail.

5. A computer-readable medium as described in claim 3, wherein, in said method:

said first expanded view comprises a first plurality of first-content-source snapshots;

said first plurality of first-content-source snapshots are arranged in temporal order; and each snapshot in said first plurality of first-content-source snapshots is associated with one of a plurality of saliency events associated with said first content source.

6. A computer-readable medium as described in claim 3, wherein, in said method:

said first expanded view comprises a first snapshot of said first content source; and said first snapshot is overlaid with a first region indicator demarcating a first region, of said first snapshot, associated with a first meeting participant.

7. A computer-readable medium as described in claim 3, wherein, in said method:

said first expanded view comprises a first snapshot of said first content source; and said first snapshot is overlaid with a first region indicator demarcating a first region, of said first snapshot, associated with a first semantic relationship.

8. A computer-readable medium as described in claim 3, wherein, in said method:

said first expanded view comprises a first snapshot of said first content source; and said first snapshot is overlaid with a first region indicator demarcating a first region, of said first snapshot, associated with a first syntactic relationship.

9. A computer-readable medium as described in claim 3, wherein, in said method:

said first expanded view comprises a first snapshot of said first content source; and said first snapshot is overlaid with a temporal-progression sequence indicator.

10. A computer-readable medium as described in claim 3, wherein, in said method:

said first expanded view comprises a first plurality of first-content-source snapshots; and said first plurality of first-content-source snapshots are arranged in a clockwise temporal order in relation to a first-time-instance first expanded-view node associated with said first-time-instance first node, wherein a first first-content-source snapshot associated with a temporally first time instance is positioned directly above said first-time-instance first expanded-view node.

11. A computer-readable medium as described in claim 3, wherein, in said method, said first expanded view of said first-time-instance first node is a view type selected from the group consisting of a salience-based meeting-content source summary, a static summary clustered by primary contributor, a static summary clustered according to semantic relationship, a static summary clustered according to syntactic relationship, a static summary displayed in conjunction with a temporal-progression sequence indicator, a wagon wheel view and a hierarchical-form expanded view.

12. A computer-readable medium as described in claim 1, said method further comprising:

associated with a second time instance, rendering a second-time-instance first node, associated with said first content source, wherein said second-time-instance first node is rendered at a second size related to a second amount of time expended, during said meeting, on said first content source.

13. A computer-readable medium as described in claim 12, said method further comprising:

associated with said second time instance, rendering a second-time-instance second node, associated with a second content source, wherein said second-time-instance second node is rendered at a third size related to a third amount of time expended, during said meeting, on said second content source.

14. A computer-readable medium as described in claim 13, said method further comprising:

associated with said second time instance, rendering a second-time-instance first arc between said second-time-instance first node and second-time-instance second node, wherein said second-time-instance first arc is rendered at a first thickness related to a first number of transitions between said first content source and said second content source.

15. A computer-readable medium as described in claim 14, wherein, in said method, said second-time-instance first arc is a directed arc.

16. A computer-readable medium as described in claim 1, wherein, in said method, said first-time-instance first node is rendered with a first visual property associated with a first content-source property associated with said first content source.

17. A computer-readable medium as described in claim 16, wherein, in said method, said first content-source property is a content-source property selected from the group consisting of a source type and a generating application.

18. A computer-readable medium as described in claim 16, wherein, in said method, said first visual property is a visual property selected from the group consisting of a fill color, a fill type, a fill pattern, a fill transparency, an outline color, an outline style and a node shape.

19. A computer-readable medium as described in claim 1, said method further comprising a temporal-progression indicator.

20. A non-transitory, computer-readable medium encoded with a computer program code for implementing a method for rendering a summary view associated with a content source, said method comprising:
associated with a first time instance, rendering a first plurality of first-content-source snapshots associated with a first content source, wherein said first plurality of first-content-source snapshots are arranged in a hierarchical form according to level of detail.

21. A non-transitory, computer-readable medium encoded with a computer program code for implementing a method for rendering a summary view associated with a content source, said method comprising:
associated with a first time instance, rendering in a first region, a first plurality of first-content-source snapshots associated with a first content source, wherein:
said first plurality of first-content-source snapshots are arranged in temporal order; and
each snapshot in said first plurality of first-content-source snapshots is associated with one of a plurality of pre-defined events associated with said first content source, wherein each of said pre-defined events corresponds to an event region.

* * * * *